(12) United States Patent
Wang et al.

(10) Patent No.: US 12,127,509 B1
(45) Date of Patent: Oct. 29, 2024

(54) CONTROL METHOD AND SYSTEM FOR WATER AND FERTILIZER UNDER DRIP IRRIGATION

(71) Applicant: INST. ENVIR. & SUSTAINABLE DEVELOP. IN AGRI., CAAS, Beijing (CN)

(72) Inventors: Haitao Wang, Beijing (CN); Jiandong Wang, Beijing (CN); Xurong Mei, Beijing (CN); Xiaoyang Liang, Beijing (CN); Xuefeng Qiu, Beijing (CN); Hang Wang, Beijing (CN); Baoqing Chen, Beijing (CN); Chuanjuan Wang, Beijing (CN); Wenyi Dong, Beijing (CN); Xiangnan Li, Beijing (CN); Chunhao Fang, Beijing (CN)

(73) Assignee: Institute of Environment and Sustainable Development in Agriculture, Chinese Academy of Agriculture Sciences, Beijing (CN)

( * ) Notice: Subject to any disclaimer, the term of this patent is extended or adjusted under 35 U.S.C. 154(b) by 0 days.

(21) Appl. No.: 18/766,229

(22) Filed: Jul. 8, 2024

(30) Foreign Application Priority Data

Jan. 15, 2024 (CN) .......................... 202410054470.X

(51) Int. Cl.
*A01G 25/02* (2006.01)
*A01G 25/16* (2006.01)

(52) U.S. Cl.
CPC ......... *A01G 25/023* (2013.01); *A01G 25/165* (2013.01)

(58) Field of Classification Search
None
See application file for complete search history.

(56) References Cited

U.S. PATENT DOCUMENTS

2019/0014717 A1* 1/2019 Yang .................... A01C 23/007

* cited by examiner

*Primary Examiner* — Ryan A Jarrett
(74) *Attorney, Agent, or Firm* — Ming Jing; MM IP SERVICES LLC

(57) ABSTRACT

Provided are a control method and system for water and fertilizer under drip irrigation. In the method, the crop type, soil type, fertilizer type, water-fertilizer irrigation amount and other factors are coupled with the drip irrigation tape parameters in the drip irrigation system, and matching calculation is performed to obtain the fertilization duration. In addition, deduction and calculation are performed according to the solubility of the fertilizer, the fertilization amount, the rotation irrigation area and the fertilization duration determined by the self-allocation system, and the characteristic that the maximum fertilizer absorption amount is reached when the outlet of the Venturi fertilizer applicator is at −9 m is combined, so as to determine key components of the fertilizing machine in the drip irrigation system.

6 Claims, 1 Drawing Sheet

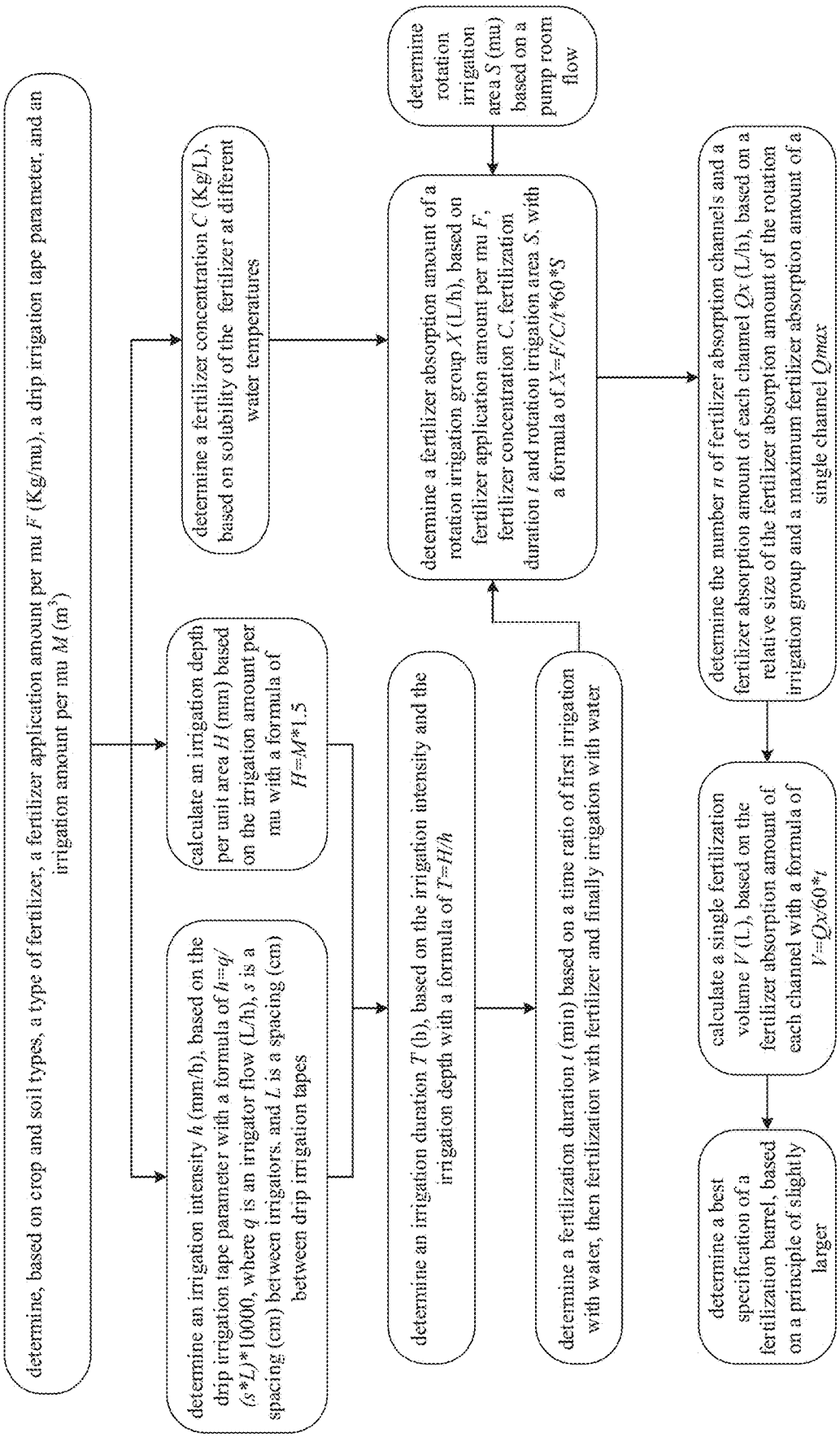

CONTROL METHOD AND SYSTEM FOR WATER AND FERTILIZER UNDER DRIP IRRIGATION

FIELD

The present disclosure relates to the technical field of intelligent agricultural irrigation machinery, in particular to a control method and system for water and fertilizer under drip irrigation in an intelligent integrative water and fertilizer irrigation machine.

BACKGROUND

Water-fertilizer integration technology has been widely popularized and applied in the country. However, the existing integrative drip irrigation system or equipment for water and fertilizer can only mix the fertilizer with water simply and output it, which has a low level of intelligence, and it is difficult to accurately control the fertilization duration, fertilization amount, fertilization speed and so on. For example, CN 210 671 302U proposed an intelligent water and fertilizer irrigation machine (fertilizing machine), which adopts a cloud control system, and can automatically adjust an electromagnetic valve to adjust the flow, based on the different needs of plants for fertilizers and the liquid level meter monitored. It enables automatic adjustment of the fertilizer absorption, and allows for precise fertilization. Through a communication module, a mobile phone, tablet or computer may be used for remote operation, and important parameters such as the fertilization duration, fertilization amount and fertilization speed can be set remotely. It effectively solves the existing technical problems. However, the determination of the fertilization duration and fertilization amount and other parameters is completely determined depending on manual experience, and it fails to achieve efficient and accurate control.

In the drip irrigation system, in order to avoid the leaching loss of fertilizer, and to improve the anti-blocking performance, fertilizer utilization efficiency and crop quality and yield, the relative time of application of the water and fertilizer is usually allocated. Specifically, it is allocated in such a manner that water is first irrigated, then the fertilizer is applied, and finally the water is irrigated again.

However, at present, this technical scheme only uses an empirical irrigation duration as the total duration for allocation of the water irrigation and fertilization. It divides, according to a certain proportion, the total duration into an irrigation duration before fertilization, a fertilization duration and an irrigation duration after fertilization. Because this total duration is only an empirical value, it does not allow for precise irrigation and fertilization. Therefore, a set of allocation control system suitable for water and fertilizer under drip irrigation is needed.

The water and fertilizer control system usually uses fertilizer applicators as terminal equipment to execute commands, but it is directly or indirectly affected by multiple factors such as crop type, soil type and fertilizer type in use, and it is unable to determine key components such as the number of channels in the fertilizing machine, the amount of fertilizer to be adjusted for each channel, the specification of the float flowmeter and the specification of the fertilization barrel. Therefore, from the perspective of the physical composition system, a matching method suitable for a control system for water and fertilizer under drip irrigation is also needed.

To sum up, there is an urgent need for a control method and system for water and fertilizer under drip irrigation.

SUMMARY

In order to alleviate or even solve at least one problem in the related art, the present disclosure provides a control method and system for water and fertilizer under drip irrigation.

In order to achieve the above purpose, the present disclosure provides the following technical schemes.

In a first aspect of the present disclosure, a control method for controlling water and fertilizer under drip irrigation is proposed, and the method includes:

acquiring, based on a crop type and a soil type, a type of fertilizer, a fertilizer application amount per mu F (Kg/mu), a drip irrigation tape parameter, and an irrigation amount per mu M (m3);

determining an irrigation intensity h (mm/h), based on the drip irrigation tape parameter according to a calculation formula of:

$$h=q/(s*L)*10000,$$

where q is an irrigator flow (L/h), s is a spacing (cm) between irrigators, and L is a spacing (cm) between drip irrigation tapes;

calculating an irrigation depth per unit area H (mm), based on the irrigation amount per mu according to a calculation formula of:

$$H=M*1.5,$$

where M is the irrigation amount per mu (m3);

determining an irrigation duration T (h), based on the irrigation intensity h and the irrigation depth H according to a calculation formula of:

$$T=H/h;$$

determining a time ratio based on a sequence of irrigating the water and applying the fertilizer, and then determining a fertilization duration t (min), where the sequence of irrigating the water and applying the fertilizer is a sequence of first irrigation with the water, then fertilization with the fertilizer, and finally irrigation with the water again; determining a fertilizer concentration C (Kg/L), based on solubility of the type of fertilizer at different water temperatures;

determining rotation irrigation area S (mu), based on a pump room flow;

determining a fertilizer absorption amount of a rotation irrigation group X (L/h), based on the fertilizer application amount per mu F, the fertilizer concentration C, the fertilization duration t and the rotation irrigation area S, according to a calculation formula of:

$$X=F/C/t*60*S;$$

determining the number n of fertilizer absorption channels and a fertilizer absorption amount of each channel Qx (L/h), based on a relative size of the fertilizer absorption amount of the rotation irrigation group X and a maximum fertilizer absorption amount of a single channel Qmax;

calculating a single fertilization volume V (L), based on the fertilizer absorption amount of each channel Qx according to a calculation formula of:

$$V=Qx/60*t;$$

and determining a best specification of a fertilization barrel, based on a principle of slightly larger.

Furthermore, in some embodiments of the present disclosure, the time ratio of first irrigation with the water, then fertilization with the fertilizer and finally irrigation with the water again is 1:1:1 or 2:1:1.

Furthermore, in some embodiments of the present disclosure, in the drip irrigation tape parameter, the irrigator flow is set to be in a range from 0.4 L/h to 4 L/h, and the spacing between irrigators is set to be an integer multiple of 10 cm.

Furthermore, in some embodiments of the present disclosure, the spacing between drip irrigation tapes is set according to a spacing between crop rows or irrigation engineering design.

In a second aspect of the present disclosure, a control system for water and fertilizer under drip irrigation is further proposed, and the system includes a control module and a pipeline module.

The control module includes a controller and a screen, and the controller is electrically connected with the screen. The pipeline module includes a water pump, a fertilizer absorption channel and a fertilization barrel, and the water pump is communicated with the fertilization barrel through the fertilizer absorption channel.

The control module serves as a superior module of the pipeline module, and is configured to issue a command to the pipeline module.

Furthermore, in some embodiments of the present disclosure, in the fertilizer absorption channel, a float flowmeter, a flow regulating valve and a Venturi fertilizer applicator are provided in sequence in a direction along which the absorbed fertilizer flows.

Furthermore, in some embodiments of the present disclosure, a fertilizer absorption amount measured when an outlet of the Venturi fertilizer applicator is at a pressure of −9 m is the maximum fertilizer absorption amount of the single channel, an inlet of the Venturi fertilizer applicator is communicated with downstream of a main irrigation pipe, the outlet of the Venturi fertilizer applicator is communicated with an inlet of the water pump, and an outlet of the water pump is communicated with upstream of the main irrigation pipe.

Furthermore, in some embodiments of the present disclosure, a flow specification of the float flowmeter is selected according to the maximum fertilizer absorption amount of the single channel, and a size is selected to be a nominal diameter of 20 mm.

Furthermore, in some embodiments of the present disclosure, the specification of the fertilization barrel is selected as an integer multiple of 10 L or 100 L according to actual needs.

Furthermore, in some embodiments of the present disclosure, an executive equipment of the system is a fertilizing machine.

Beneficial Effects:

1. In the present disclosure, the crop type, soil type, fertilizer type, water-fertilizer irrigation amount and other factors are coupled with the drip irrigation tape parameters in the drip irrigation system, and matching calculation is performed. In this way, it skillfully realizes self-allocation of water irrigation and fertilization for the changeable and complicated drip irrigation system, and abandons the method of allocating the irrigation duration and the fertilization duration depending on the empirical irrigation duration, so that the irrigation and fertilization are more precisely quantified.

2. In the present disclosure, based on the self-allocation control system for water and fertilizer under drip irrigation, deduction and calculation are performed according to the solubility of the fertilizer, the fertilization amount, the rotation irrigation area and the fertilization duration determined by the self-allocation system, and the characteristic that the maximum fertilizer absorption amount is reached when the outlet of the Venturi fertilizer applicator is at −9 m is skillfully combined. In this way, it solves the problem of multiple blind boxes in key components of the fertilizing machine in the changeable drip irrigation system, that is, the selection or adjustment of multiple key components, including but not limited to the determination of the number of channels in the fertilizing machine, the selection of the specifications of the float flowmeter and the fertilization barrel, and how to adjust the fertilizer absorption amount of each channel. More importantly, it realizes the organic matching of selection for key components and the adjustment functions in the self-allocation control system for water and fertilizer under drip irrigation. In the present disclosure, it can greatly reduce the cost of the control system for water and fertilizer under drip irrigation, through the reasonable selection of key components of the fertilizing machine.

BRIEF DESCRIPTION OF THE DRAWINGS

In order to explain the technical schemes of the embodiments of the present disclosure more clearly, drawings needed for the embodiments are briefly introduced hereafter. It is understandable that the following drawings only show certain embodiments of the present disclosure, which therefore shall not be construed as a limitation of the scope. For those ordinary skilled in the art, other related drawings may be obtained according to these drawings without creative work.

FIG. 1 illustrates a flow chart of a control method for water and fertilizer under drip irrigation.

DETAILED DESCRIPTION

In order to make the purpose, technical schemes and advantages of the embodiments of the present disclosure more clear, the technical schemes in the embodiments of the present disclosure will be described clearly and comprehensively with the attached drawings. Obviously, the described embodiments are a part, rather than all, of embodiments of the present disclosure. The components of the embodiments of the present disclosure generally described and illustrated in the drawings herein can be arranged and designed in various different configurations. Therefore, the following detailed description of the embodiments of the present disclosure provided in the accompanying drawings is not intended to limit the scope of the present disclosure, but merely represents selected embodiments of the present disclosure. Based on the embodiments in the present disclosure, all other embodiments obtained by those ordinary skilled in the art without creative work belong to the scope of protection of the present disclosure.

It is notable that similar reference signs and letters indicate similar items in the following drawings. Therefore, once an item is defined in one drawing, it does not need to be further defined and explained in subsequent drawings.

In the present disclosure, all embodiments, implementations and features of the present disclosure can be combined with each other without contradiction or conflict. In the present disclosure, common equipment, devices, components, etc. can be purchased commercially or made according to the contents disclosed in the present disclosure. In the present disclosure, in order to highlight the key points of the present disclosure, description of some conventional operations, equipment, devices and components is omitted or simplified.

Example 1

As illustrated in FIG. 1, this example of the present disclosure takes corn in loam for example.

The type of fertilizer for the corn was urea, the fertilizer application amount per mu F was 5 Kg/mu, and the irrigation amount per mu M was 30 m3. The irrigation amount per mu and the fertilizer application amount per mu were single use.

The corn was planted with a row spacing of 50 cm and a planting spacing of 30 cm.

The drip irrigation tape parameter was determined, based on the row spacing and planting space of the corn and the soil type.

The irrigator flow may be selected as 1.5 L/h, the spacing between irrigators was selected as an integer multiple of 30 cm, and the spacing between drip irrigation tapes was set as 50 cm.

The irrigation intensity h (mm/h) was determined based on the determined drip irrigation tape parameters according to a calculation formula of:

$$h=q/(s*L)*10000=1.5/(30*50)*10000=10 \text{ mm/h},$$

where q is the irrigator flow (L/h), s is the spacing (cm) between irrigators, and L is the spacing (cm) between drip irrigation tapes.

Based on the irrigation amount per mu, an irrigation depth per unit area H (mm) was calculated according to a calculation formula of:

$$H=M*1.5=30*1.5=45 \text{ mm}.$$

An irrigation duration T (h) was determined based on the irrigation intensity h and the irrigation depth H according to a calculation formula of:

$$T=H/h=45/10=4.5h.$$

A sequence of irrigating the water and applying the fertilizer took a principle of first irrigation with the water, then fertilization with the fertilizer, and finally irrigation with the water again.

According to the mode of first irrigation with the water, then fertilization with the fertilizer, and finally irrigation with the water again, a time ratio of first irrigation with the water, then fertilization with the fertilizer and finally irrigation with the water again was taken as 1:1:1, and the fertilization duration was calculated to be 90 min.

Then, based on a fact that the selected type of fertilizer was urea, and it was assumed that the water temperature in the fertilization barrel was 20° C. at which the solubility of urea is 105 g per 100 g water, a fertilizer concentration C was determined to be 1.05 Kg/L.

Based on a pump room flow, the rotation irrigation area was determined as 100 mu.

Based on the determined fertilizer application amount per mu F of 5 Kg/mu, fertilizer concentration C of 1.05 Kg/L, fertilization duration t of 90 min and rotation irrigation area S of 100 mu, a fertilizer absorption amount X (L/h) of a rotation irrigation group was determined according to a calculation formula of:

$$X=F/C/t*60*S=5/1.05/90*60*100=317.46 \text{ L/h}.$$

A maximum fertilizer absorption amount of a single channel should be determined according to the fertilizer absorption amount measured when the outlet of the Venturi fertilizer applicator is at a pressure of −9 m. The inlet of the Venturi fertilizer applicator was communicated with the downstream of a main irrigation pipe, the outlet of the Venturi fertilizer applicator was communicated with the inlet of a water pump, and the outlet of the water pump was communicated with the upstream of the main irrigation pipe.

In Example 1, the Venturi fertilizer applicator was selected as one with model ZB-WQL-500 produced by Zhongbo Digital Agriculture (Zibo) Co., Ltd. The fertilizer absorption amount of this Venturi fertilizer applicator measured when the outlet thereof is at the pressure of −9 m is 500 L/h, that is, the maximum fertilizer absorption amount of the single channel Qmax was 500 L/h.

The flow specification of the float flowmeter was selected according to the maximum fertilizer absorption amount of the single channel of 500 L/h, and the size thereof was selected to be a nominal diameter of 20 mm. That is, the flow specification of the float flowmeter was selected as 500 L/h.

Example 2

Based on the fertilizer absorption amount of the rotation irrigation group in Example 1, X=318 L/h<500 L/h, it was determined that the requirement can be met when the number of fertilizer absorption channels was one, i.e., n=1. That is, it can be designed as a single-channel fertilizing machine. In addition, the opening of the flow regulating valve in the fertilizer absorption channel was adjusted and the indicator of the float flowmeter was observed, until the fertilizer absorption amount of the channel Qx was adjusted to 317.46 L/h.

Furthermore, a single fertilization volume V (L) was calculated based on the fertilizer absorption amount of the channel Qx=318 L/h according to a calculation formula of:

$$V=Qx/60*t=318/60*90=477 \text{ L}.$$

Based on a principle of slightly larger while meeting a requirement that the specification of the fertilization barrel is an integer multiple of 100 L, the optimal specification of the fertilization barrel was finally determined to be 500 L.

Example 3

Assuming that the fertilizer absorption amount of the rotation irrigation group in Example 1 was X=600 L/h, in this case, X is larger than 500 L/h (the maximum fertilizer absorption amount of the single channel Qmax). Then, the requirement is no longer met when the number n of the fertilizer absorption channels is 1.

It is illustrated on the premise that the fertilizer absorption amount of the Venturi fertilizer applicator is not changed.

In this case, n=X/Qmax=600/500=1.2, and n should be an integer. Accordingly, n was determined as 2. That is, it can be designed as a dual-channel fertilizing machine.

Accordingly, the fertilizer absorption amount of each channel is calculated as:

$$Qx=X/n=600/2=300 \text{ L/h}$$

The opening of the flow regulating valve in the fertilizer absorption channel was adjusted and the indicator of the float flowmeter was observed, until the fertilizer absorption amount of the channel Qx was adjusted to 300 L/h.

Furthermore, the single fertilization volume V (L) was calculated based on the fertilizer absorption amount of the channel Qx=300 L/h according to a calculation formula of:

V=Qx/60*t=300/60*90=450 L.

Based on the principle of slightly larger while meeting a requirement that the specification of the fertilization barrel is an integer multiple of 100 L, the optimal specification of the fertilization barrel was finally determined to be 500 L. Each fertilizer absorption channel is equipped with one fertilization barrel, that is, the total number is two.

Example 4

Another object of the embodiments of the resent disclosure is directed at a control system for water and fertilizer under drip irrigation, and the system includes a control module and a pipeline module.

The control module includes a controller, a screen and supporting electrical devices. The controller is electrically connected with the screen. The pipeline module includes a water pump, a fertilizer absorption channel and a fertilization barrel. The water pump is communicated with the fertilization barrel through the fertilizer absorption channel.

The control module serves as a superior module of the pipeline module, and is configured to issue a command to the pipeline module.

In the fertilizer absorption channel, a float flowmeter, a flow regulating valve and a Venturi fertilizer applicator are provided in sequence in a direction along which the absorbed fertilizer flows.

A fertilizer absorption amount measured when the outlet of the Venturi fertilizer applicator is at a pressure of −9 m is the maximum fertilizer absorption amount of the single channel. The flow specification of the float flowmeter should be selected according to the maximum fertilizer absorption amount of the single channel, and the size thereof should be selected to be a nominal diameter of 20 mm.

Example 5

Another purpose of the embodiments of the present disclosure is to provide a control system for water and fertilizer under drip irrigation, and the executive equipment of the system is a fertilizing machine.

The foregoing is just the preferred embodiments of the present disclosure, and it is not used to limit the present disclosure. For those skilled in the art, the present disclosure may have various modifications and variations. Any modification, equivalent substitution, improvement, etc. made within the spirit and principle of the disclosure should fall into the protection scope of the present disclosure.

What is claimed is:

1. A control method for water and fertilizer under drip irrigation, the method comprising:
   acquiring, based on a crop type and a soil type, a type of fertilizer, a fertilizer application amount per mu F measured in Kg/mu, a drip irrigation tape parameter, and an irrigation amount per mu M measured in $m^3$;
   determining an irrigation intensity h measured in millimeter/hour, based on the drip irrigation tape parameter according to a calculation formula of:

h=q/(s*L)*10000, where q is an irrigator flow measured in liter/hour, s is a spacing between irrigators measured in centimeter, and L is a spacing between drip irrigation tapes measured in centimeter;

calculating an irrigation depth per unit area H measured in millimeter, based on the irrigation amount per mu according to a calculation formula of:

H=M*1.5, where M is the irrigation amount per mu;
   determining an irrigation duration T measured in hour, based on the irrigation intensity h and the irrigation depth H according to a calculation formula of:

T=H/h;

determining a time ratio based on a sequence of irrigating the water and applying the fertilizer, and then determining a fertilization duration t measured in minute, wherein the sequence of irrigating the water and applying the fertilizer is a sequence of first irrigation with the water, then fertilization with the fertilizer, and finally irrigation with the water again;
   determining a fertilizer concentration C measured in kilogram/liter, based on solubility of the type of fertilizer at different water temperatures;
   determining rotation irrigation area S measured in mu, based on a pump room flow;
   determining a fertilizer absorption amount of a rotation irrigation group X measured in liter/hour, based on the fertilizer application amount per mu F, the fertilizer concentration C, the fertilization duration t and the rotation irrigation area S, according to a calculation formula of:

X=F/C/t*60*S;

determining the number n of fertilizer absorption channels and a fertilizer absorption amount of each channel Qx measured in liter/hour, based on a relative size of the fertilizer absorption amount of the rotation irrigation group X and a maximum fertilizer absorption amount of a single channel Qmax;
   calculating a single fertilization volume V measured in liter, based on the fertilizer absorption amount of each channel Qx according to a calculation formula of:

V=Qx/60*t;

and
   determining a best specification of a fertilization barrel, based on a principle of slightly larger.

2. The control method for water and fertilizer under drip irrigation of claim 1, wherein the time ratio of first irrigation with the water, then fertilization with the fertilizer and finally irrigation with the water again is 1:1:1 or 2:1:1.

3. The control method for water and fertilizer under drip irrigation of claim 1, wherein in the drip irrigation tape parameter, the irrigator flow is set to be in a range from 0.4 L/h to 4 L/h, and the spacing between irrigators is set to be an integer multiple of 10 cm.

4. The control method for water and fertilizer under drip irrigation of claim 1, wherein the method is implemented by a fertigation control system, and the control system comprises:
   a control module comprising a controller and a screen, wherein the controller is electrically connected with the screen; and
   a pipeline module comprising a water pump, a fertilizer absorption channel and a fertilization barrel, wherein the water pump is communicated with the fertilization barrel through the fertilizer absorption channel;
   the control module serves as a superior module of the pipeline module, and is configured to issue a command to the pipeline module;

in the fertilizer absorption channel, a float flowmeter, a flow regulating valve and a Venturi fertilizer applicator are provided in sequence in a direction along which absorbed fertilizer flows; and a fertilizer absorption amount measured when an outlet of the Venturi fertilizer applicator is at a pressure of −9 m is the maximum fertilizer absorption amount of the single channel, an inlet of the Venturi fertilizer applicator is communicated with downstream of a main irrigation pipe, the outlet of the Venturi fertilizer applicator is communicated with an inlet of the water pump, and an outlet of the water pump is communicated with upstream of the main irrigation pipe.

5. The control method for water and fertilizer under drip irrigation of claim 4, wherein a flow specification of the float flowmeter is selected according to the maximum fertilizer absorption amount of the single channel, and a size is selected to be a nominal diameter of 20 mm.

6. The control method for water and fertilizer under drip irrigation of claim 4, wherein a specification of the fertilization barrel is selected as an integer multiple of 10 L or 100 L.

\* \* \* \* \*